United States Patent [19]

Ide et al.

[11] Patent Number: 5,122,163

[45] Date of Patent: Jun. 16, 1992

[54] METHOD OF ISOTOPE SEPARATION AND A THERMAL DIFFUSION COLUMN USED FOR THE PRACTICE THEREOF

[75] Inventors: Takahiro Ide, Chigasaki; Kazuhiro Hirata, Kamakura, all of Japan

[73] Assignee: Sumitomo Heavy Industries, Ltd., Tokyo, Japan

[21] Appl. No.: 655,699

[22] Filed: Feb. 15, 1991

[30] Foreign Application Priority Data

Feb. 22, 1990 [JP] Japan ................... 2-42049

[51] Int. Cl.⁵ ............................................. B01D 53/22
[52] U.S. Cl. ........................................... 55/16; 55/66;
       55/81; 55/158; 55/209
[58] Field of Search ............... 55/16, 66, 81, 158, 55/209

[56] References Cited

U.S. PATENT DOCUMENTS

| 2,258,594 | 10/1941 | Brewer et al. ............. 55/209 X |
| 2,585,244 | 2/1952 | Hanson ........................ 55/209 X |
| 2,688,404 | 9/1954 | Wahl ............................ 55/209 X |
| 2,905,527 | 9/1959 | Dole ............................ 55/209 X |
| 3,064,814 | 11/1962 | Grasselli et al. ............. 55/81 X |
| 3,337,051 | 8/1967 | Kerschner et al. ............ 55/209 X |
| 3,683,589 | 8/1972 | Seitz et al. .................. 55/66 X |
| 4,494,965 | 1/1985 | Ali-Khan et al. ............. 55/16 |
| 4,634,454 | 1/1987 | Khan et al. .................. 55/16 |
| 4,707,342 | 11/1987 | Iniotakis et al. ............ 55/66 X |
| 4,816,046 | 3/1989 | Maeba et al. ................ 55/209 |
| 4,881,958 | 11/1989 | Eckardt et al. .............. 55/66 X |

FOREIGN PATENT DOCUMENTS

| 173682 | 1/1953 | Austria ........................ 55/209 |
| 62-227428 | 10/1987 | Japan . | |
| 63-310618 | 12/1988 | Japan .......................... 55/209 |
| 241897 | 8/1946 | Switzerland ................ 55/209 |
| 611068 | 10/1948 | United Kingdom ........ 55/81 |
| 682392 | 11/1952 | United Kingdom ........ 55/81 |

Primary Examiner—Robert Spitzer
Attorney, Agent, or Firm—Armstrong, Nikaido, Marmelstein, Kubovcik & Murray

[57] ABSTRACT

A method of isotope separation by concentration and separation of an isotope-containing gas in a thermal diffusion column having a hot wall at a higher temperature Th and a cold wall at a lower temperature Tc, wherein Th is set below $T_1$ which is the temperature at which the isotopic equilibrium reaction of the desired isotope starts, and Tc is set below ambient temperature and above $T_2$ which is the temperature at which the gas containing the desired isotope begins to condense and liquefy.

9 Claims, 4 Drawing Sheets

METHOD OF ISOTOPE SEPARATION AND A THERMAL DIFFUSION COLUMN USED FOR THE PRACTICE THEREOF

BACKGROUND OF THE INVENTION

The present invention relates to a method of isotope separation utilizing thermal diffusion and a thermal diffusion column used for the practice thereof, and in particular to a method of isotope separation utilizing thermal diffusion which can improve the separation efficiency by reducing undesirable isotopic equilibrium reactions, and also to a thermal diffusion column used for the practice thereof.

In the areas of nuclear engineering, life science and others the use of isotopes is going to increase. Isotopes are produced (separated) mainly by the methods of ion exchange, membrane and the like.

Besides, isotopes can be roughly separated by the low temperature distillation and other methods, and then can be enriched by the thermal diffusion process. It is desired to improve the efficiency of isotope separation by these methods. Hereinafter an explanation will be made in regard to the isotope separation which utilizes thermal diffusion.

So far the isotope separation utilizing thermal diffusion has been carried out by a thermal diffusion column equipped with a hot wire along the central axis. The outer wall of thermal diffusion column is covered with a water cooled jacket in order to prevent rise of temperature. In such a thermal diffusion column, if the central hot wire is heated to a temperature between 900 K. and 1300 K., a large temperature gradient along the radial direction is formed.

The mean kinetic energy of a gaseous molecule $E_K$ is expressed as follows.

$$E_K = (\tfrac{1}{2})mv^2$$

For example, in the case of a gas mixture comprising hydrogen molecules $H_2$ and deuterium molecules $D_2$, the mass of a gaseous molecule is 2 for $H_2$ and 4 for $D_2$ respectively, and therefore there is a great difference in the mean velocity at the same temperature between $H_2$ molecules and $D_2$ molecules.

As described above, if a large temperature gradient is formed in a thermal diffusion column and thereinto a gas mixture of $(H_2+D_2)$ is introduced, the gaseous molecules having different masses will respectively make different distributions along the temperature gradient, and thus the molecules having larger masses are enriched in the side of lower temperature and the molecules having smaller masses are enriched in the side of higher temperature.

Further, a convection occurs in the thermal diffusion column, so that the gas of higher temperature around the hot wire goes up and the gas of lower temperature in the neighborhood of the water cooled wall goes down. Thus, a gas enriched with $D_2$ is obtained from the bottom of thermal diffusion column and a gas enriched with $H_2$ is obtained from the top of thermal diffusion column.

For example, in a case of separating a gas mixture comprising two hydrogen isotopes with a composition of $H_2:D_2 = 50$ vol. %:50 vol % (hereinafter referred to simply as %), a thermal diffusion column vertically set up having an inside diameter of about 30 mm and a length of about 92 cm was used and operated with a temperature of hot wire at about 1273 K. and a gaseous pressure of about 700 Torr, and then the concentration of $D_2$ at the bottom of thermal diffusion column attained to 56%. According to the provided condition, the attained concentration of $D_2$ varies to a certain extent.

Among the hydrogen isotopes beside deuterium (D), there is tritium (T). In the case of a gas mixture of three components $(H_2+D_2+T_2)$, it is possible to separate heavy molecules from light molecules according to the same principle as mentioned above.

In the isotope separation from a gas mixture of $(H_2+D_2)$ by means of such a thermal diffusion column as mentioned above, simultaneously with the thermal diffusion there proceeds an isotopic equilibrium reaction as follows.

$$H_2 + D_2 \rightarrow 2HD$$

That is to say, in the same manner as typical chemical reactions, the above reaction proceeds and produces HD in a definite equilibrium concentration. In the conventional thermal diffusion columns, the surface of hot wire which typically is make of tungsten (W), is heated to a high temperature between 900 K. and 1300 K., and in addition the surface of tungsten wire has a catalytic activity at higher temperatures, so that in a short time the isotopic equilibrium reaction proceeds to produce gaseous HD. In the result, a gas mixture of two components is converted into that of three components, and thus the degree of separation is extremely reduced. Besides, instead of the tungsten hot wire, also a stainless steel wire can be used. The latter has a higher catalytic activity than the former and can lower the hot wire temperature in the extent of about 100° C. under that of the former.

As mentioned above, in the conventional isotope separation utilizing thermal diffusion, the undesirable isotopic equilibrium reaction proceeds at the same time, which has caused the reduction of separation efficiency.

SUMMARY OF THE INVENTION

The object of the present invention is to provide a method of isotope separation utilizing thermal diffusion which can improve the separation efficiency by reducing undesirable isotopic equilibrium reactions.

Another object of the present invention is to provide a thermal diffusion column in order to carry out the isotope separation in which the separation efficiency is improved by reducing the undesirable isotopic equilibrium reactions.

Further, still another object of the present invention is to provide a method of isotope separation which can efficiently utilize the components comprising undesirable isotopes and a thermal diffusion column for the practice of said method.

The method of isotope separation according to the present invention is a method to carry out concentration and separation of isotope-containing gases by means of a thermal diffusion column which has a hot wall of a higher temperature Th (for example, an electric heater) and a cold wall of a lower temperature Tc. In the method, said higher temperature Th is set to a temperature below the temperature $T_1$ at which the isotopic equilibrium reaction of the objective isotope starts, and said lower temperature Tc is set to a temperature which is below the ambient temperature and above a temperature $T_2$ at which the gas containing said isotope begins to condense and liquefy.

Besides, the thermal diffusion column according to the present invention is a column for carrying out concentration and separation of isotope-containing gases, which comprises a vertically long reaction vessel composed of a low temperature resistant material and capable to contain gastightly, a hot wall vertically set at the center of said reaction vessel (for example, an electric heater), a means to heat said hot wall to a temperature below the temperature at which the isotopic equilibrium reaction of objective isotope starts, and a means to cool the outer wall of said reaction vessel to a temperature which is below the ambient temperature and above the temperature at which the gas containing said isotope begins to condense and liquefy.

DESCRIPTION OF THE PREFERRED EMBODIMENTS

Example

Figure 1:
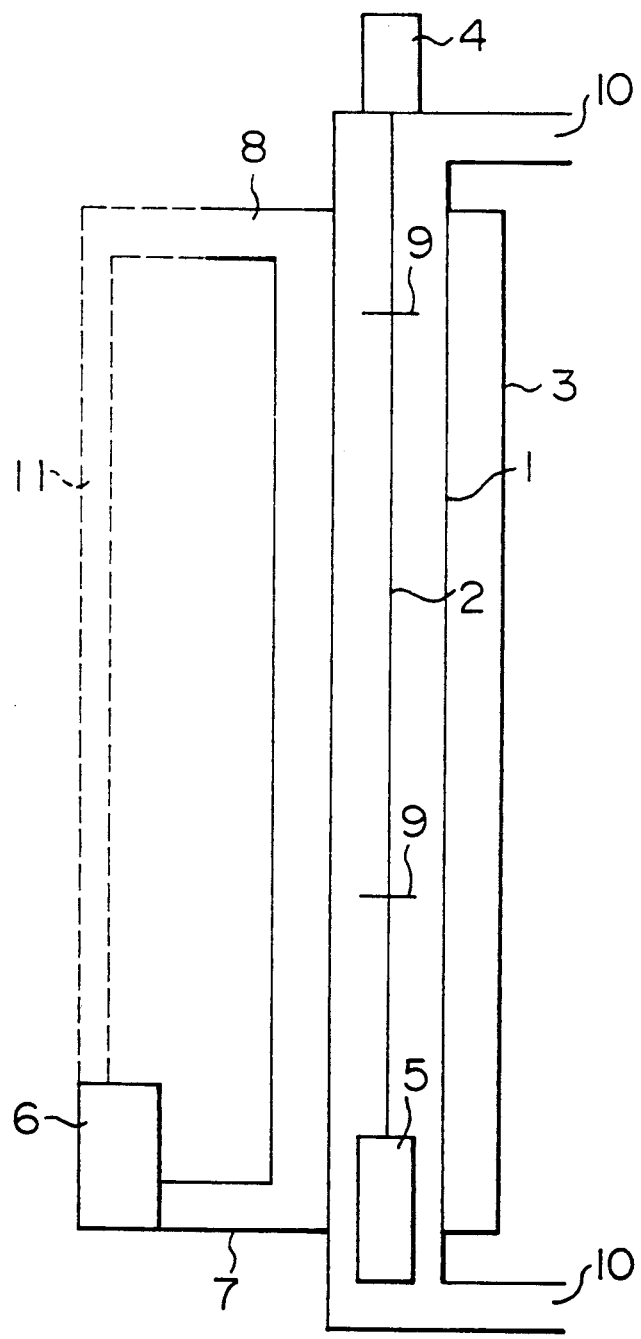
FIG. 1 is a cross-sectional view showing the thermal diffusion column according to an example of the present invention.

In FIG. 1, a thermal diffusion column according to the first example of the present invention. In said drawing, the reaction vessel 1 is a gastight tubular vessel made of hard glass, quartz glass, stainless steel, oxygen-free copper or other materials. The dimensions of reaction vessel 1 are about 30 mm in the inner diameter and about 92 cm in the length. The reaction vessel stands vertically and its outer wall is covered with a refrigerant jacket 3. The refrigerant jacket 3 is made of a material similar to those of the reaction vessel 1, and forms a jacket containing a refrigerant between it and the outer wall of reaction vessel 1. As the refrigerant, a liquid or gas which can work below 273 K., such as liquid nitrogen, liquid air, liquid hydrogen, Freon or the like, is used. That is to say, in order to prevent temperature rise over the ambient temperature, the outer wall is not cooled with water, but cooled with a refrigerant in order to be cooled to a temperature below the ambient temperature, or more preferably below 273 K. At the lower end of refrigerant jacket 3, a refrigerant inlet 7 is provided, and connected to a refrigerant source 6. At the upper end of refrigerant jacket 3, a refrigerant outlet 8 is provided, and forms an out fall of the refrigerant which has been warmed by the outer wall of reaction vessel 1. In case of need, if the refrigerant outlet 8 is connected to the refrigerant source 6 through a refrigerant circulating line 11, the refrigerant can be circulated and reused. Treated isotopes are let in and out from the treated gas inlet and outlet 10.

In the reaction vessel 1, a hot wire 2 is set along the central axis. At the lower end of this hot wire 2, a weight 5 is connected to hold the hot wire 2 in a vertically stretched state. The hot wire 2 is a heater which is heated by an electric power, and in the case of isotope separation, the temperature to be heated is lower than 473 K. The material for the heater which can be heated up to the above extent of temperature, is able to be selected from a wide range of materials such as tungsten, stainless steel or the like. However, for the hot wire 2, palladium, platinum and their alloys which have a marked catalytic activity, are not used. The hot wire 2 is formed from a wire, for example, having a radius of 150 $\mu$m. In the middle of hot wire 2, plural spacers 9 are arranged to keep a uniform distance between the hot wire 2 and the inner wall of reaction vessel 1. This spacer 9 is designed, for example, into a cross shape or the like so as not to disturb the gas flow in the reaction vessel 1. The hot wire 2 is connected with a heater electrode 4 and produces heat from resistance by sending an electric current to another electrode which is not shown in the drawing.

An example of isotope separation using a thermal diffusion column as shown in FIG. 1 will be explained.

In the example to be explained, as the starting material, hydrogen isotope a composition of $H_2:D_2 = 50\%:50\%$ is employed and an enriched $D_2$ gas is obtained.

The outer wall of reaction vessel 1 was cooled with liquid nitrogen which was used as refrigerant. Into the reaction vessel 1 was fed the above mentioned gas of starting material, which was cooled to about 90 K. Then the hot wire 2 (of tungsten) was heated up to the temperature of 473 K. Under this condition, the average gas temperature in the thermal diffusion column was 139 K.

In the isotope separation conducted under the above condition, while the isotope separation proceeded, the isotope gas maintained the composition of two components.

Figure 3:
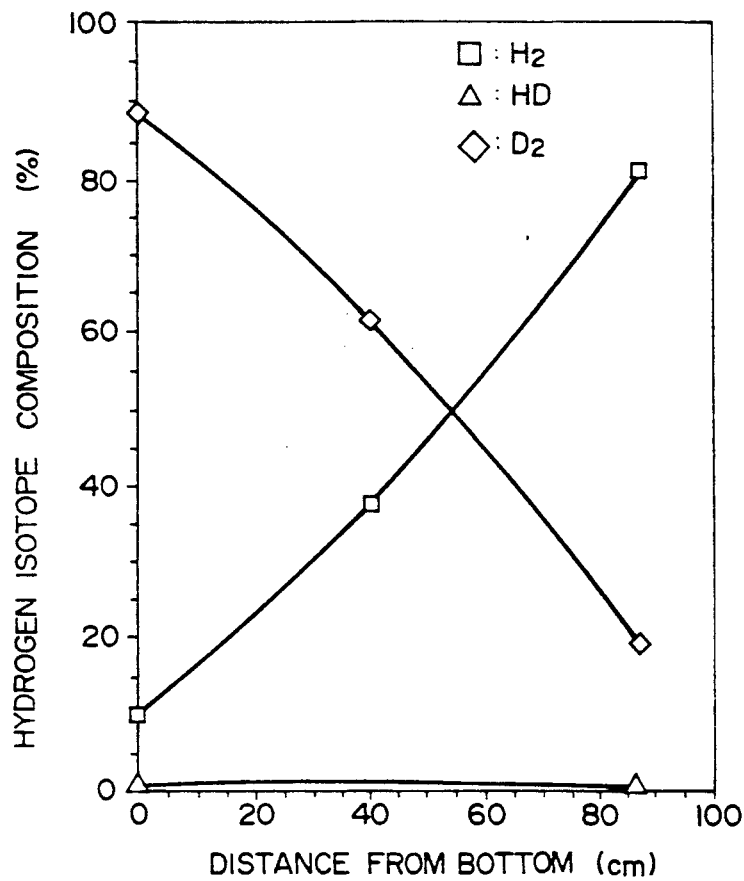
FIG. 3 shows an axial concentration distribution of hydrogen isotopes along the column in the case of using a "cryogenic-wall" column with a hot wire temperature of 473 K.

The result is shown in FIG. 3. The $D_2$ concentration at the bottom of column was improved up to 90%.

Figure 4:
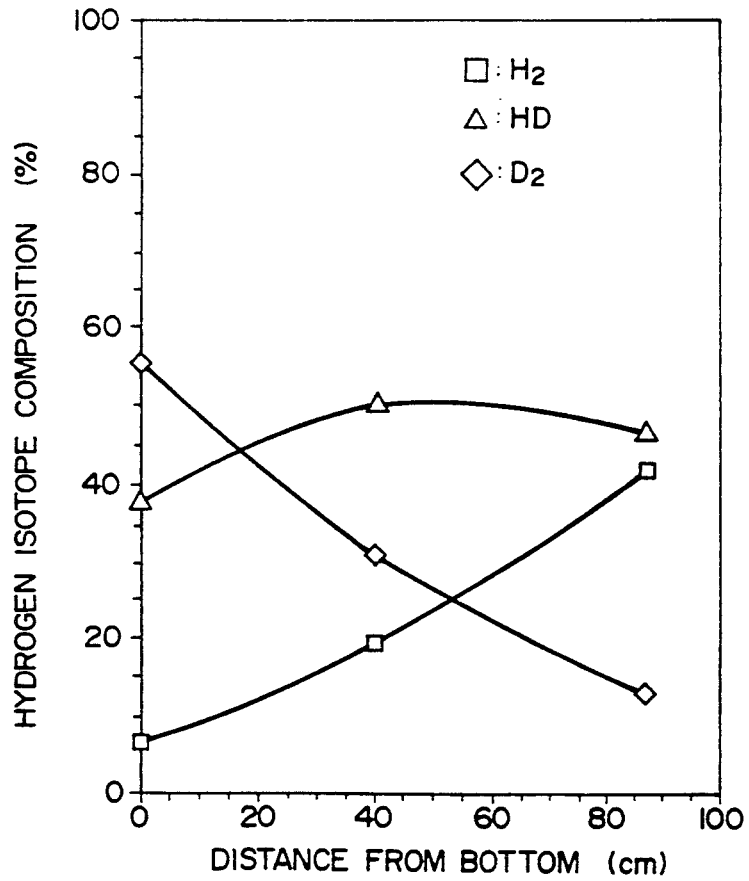
FIG. 4 shows an axial concentration distribution of hydrogen isotopes along the column in the case of using a "water cooled wall" with a hot wire temperature of 1273 K.
Figure 5:
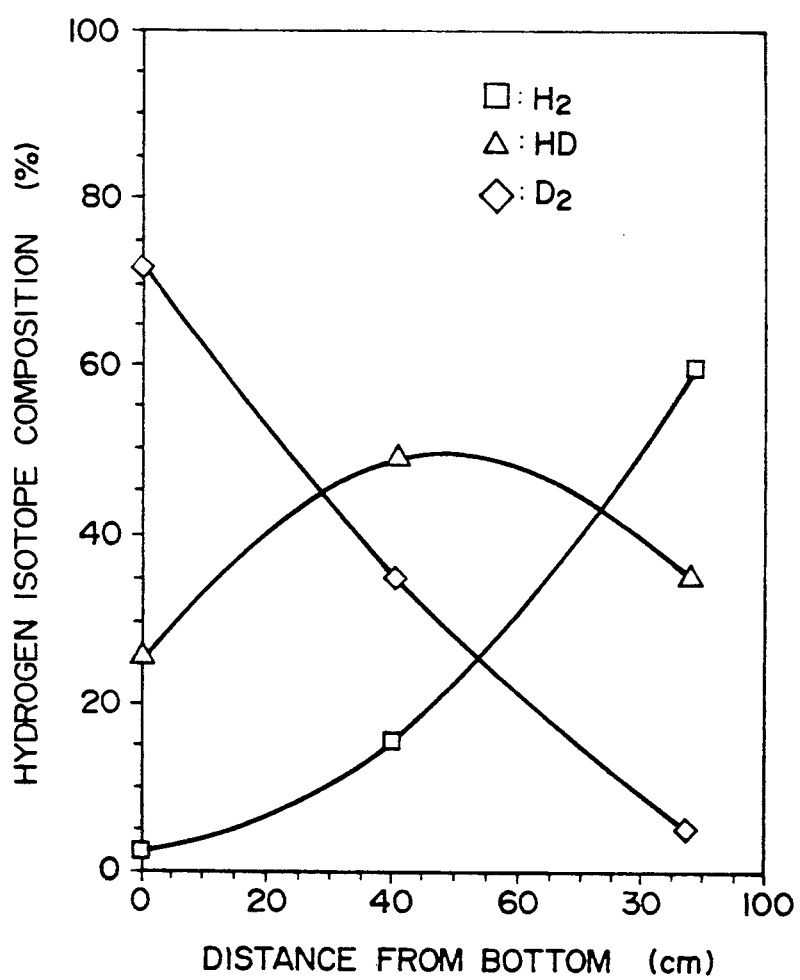
FIG. 5 shows an axial concentration distribution of hydrogen isotopes along the column in the case of using a "cryogenic-wall" column with a hot wire temperature of 1073 K.

According to the conventional technique, when the similar thermal diffusion column was used, the temperature of hot wire (using tungsten) was set at 1273 K., and the column wall was cooled with water, the obtained $D_2$ concentration at the column bottom was at most 56%. In another case, when the similar thermal diffusion column was used, the temperature of hot wire (tungsten) was set at 1073 K. (800° C.), and liquid nitrogen was used as refrigerant, the obtained $D_2$ concentration at the column bottom was 72%. It will readily be understood how the separation efficiency of said example according to the present invention is excellent, if it is compared with the abovementioned cases. For comparison, the results of said cases according the conventional technique are shown in FIG. 4 and FIG. 5 respectively.

Further, it was found that if the temperature of hot wire is raised over 473 K., an isotopic equilibrium reaction proceeds and the efficiency of isotope separation rather is decreased.

Hereinbefore, the case where liquid nitrogen as refrigerant and hydrogen isotope as isotopic gas are used, has been explained. The similar isotope separation can be proceeded by using other refrigerants and other isotope gas mixture.

Figure 2:
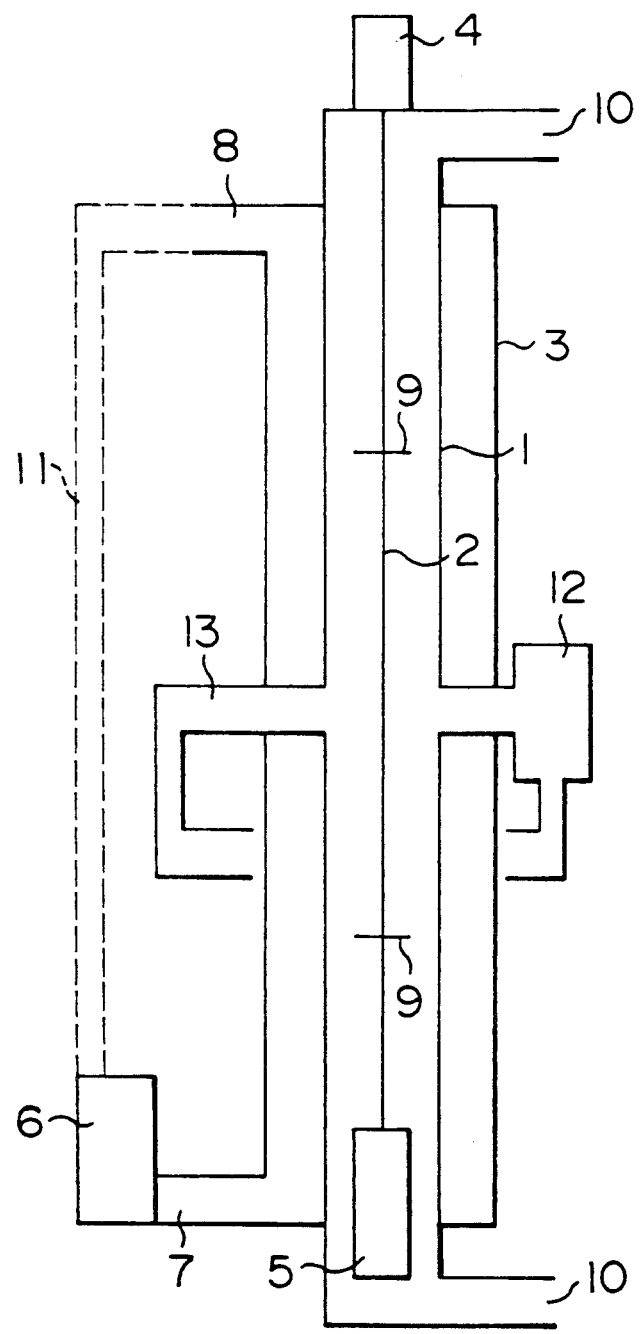
FIG. 2 is a cross-sectional view showing a thermal diffusion column according to another example of the present invention.

In FIG. 2 a thermal diffusion column according to another example is shown.

In the thermal diffusion column of FIG. 2, the reaction vessel 1, the hot wire 2, the refrigerant jacket 3, the heater electrode 4, the weight 5, the refrigerant source 6, the refrigerant inlet 7, the refrigerant outlet 8, the spacer 9, the outlet and inlet of treated gas 10, and the refrigerant circulation line 11 are similar to those explained with regard to the example of FIG. 1, hence their explanations are omitted here.

In the present example, an isotopic equilibrator 12 is connected to the middle part of reaction vessel 1 through the treated gas circulating line 13. That is to say, when a component comprising any isotope gas other than the objective component is contained, the gas is taken out from the column position where the gaseous component other than the object is enriched, and heated to a specified temperature higher than the ambient temperature. In the isotopic equilibrator 12 having an exposed catalyst surface, an isotopic equilibrium reaction proceeds to convert the undesirable component into a desired component. By returning the reaction product again to the column, the objective component can be enriched.

For example, in the case of separating the three components, $H_2 + D_2 + HD$, the HD gas enriched at the central part of the column is taken out, and the following isotopic equilibrium reaction is positively allowed to proceed.

$$2HD \rightarrow H_2 + D_2$$

Then the undesirable component HD is reduced, while the objective components $H_2$ and $D_2$ are increased. By returning the product into the thermal diffusion column, the concentration of objective component can be raised, and in addition the three components can be reduced into two components. Thus, when any undesirable component is contained, the undesirable component can be converted into a desired component to improve the separation efficiency.

In the case of isotope separation using the thermal diffusion column of FIG. 2 in order to separate gaseous hydrogen isotopes, an efficient isotope separation is attained by keeping the temperature of hot wire 2 below 473 K., and cooling the outer wall of reaction vessel 1 to a temperature lower than the ambient temperature, more preferably to a temperature below 273 K., with liquid nitrogen, liquid air, liquid oxygen, liquid hydrogen or the like.

In the present example, while controlling undesirable isotopic equilibrium reaction, by positively utilizing the specified isotopic equilibrium reaction, it is possible to reduce the undesirable component and increase the desired component in order to improve the separation efficiency.

Hereinbefore, the present invention has been explained by the way of examples. The present invention is not limited by these. It may be obvious for those skilled in the art that there can be various changes, modifications, combinations or the like.

As explained above, according to the present invention, any undesirable isotopic equilibrium reaction is reduced and the concentration of the objective isotope component is increased, so that the efficiency of isotope separation can be improved.

That is to say, the temperature of hot wall Th which is the higher temperature part in the thermal diffusion column, is set at a temperature lower than the temperature $T_1$ at which the isotopic equilibrium reaction of the objective isotope substantially begins to proceed, so that no isotopic equilibrium reaction substantially proceeds in the thermal diffusion column. In the result, any production of undesirable component can be prevented.

Besides, the temperature of cold wall which is the lower temperature part in the thermal diffusion column, is set at a temperature higher than the temperature at which a gas comprising isotopes begins to condense or liquefy, so that the thermal diffusion in the gas phase can effectively proceed.

The absolute values of temperature are decreased and a large temperature difference is simultaneously formed by heating the electric heater positioned at the center of thermal diffusion column to a temperature below the temperature at which the isotopic equilibrium reaction of the objective isotope substantially starts, and on the other hand by cooling the outer wall of reaction vessel to a temperature higher than the temperature at which the isotope-containing gas begins to condense or liquefy and lower than the ambient temperature. In the result, the isotopic equilibrium reaction can substantially be prevented and an effective thermal diffusion can be allowed to proceed.

What is claimed is:

1. A method of isotope separation by concentration of a desired gas component containing a desired isotope and separation of said desired gas component from an isotope-containing gas by means of a thermal diffusion column having a hot wall at a higher temperature Th and a cold wall at a lower temperature Tc, which comprises setting said higher temperature Th to a temperature below $T_1$ which is the temperature at which the isotopic equilibrium reaction of the desired isotope starts, and setting said lower temperature Tc to a temperature which is below the ambient temperature and above a temperature $T_2$ which is the temperature at which a gas containing said desired isotope begins to condense and liquefy.

2. A method of isotope separation according to claim 1 wherein said isotope-containing gas comprises said desired gas component which contains the desired isotope and another component which contains isotopes other than the desired isotope and said other component is concentrated in a section of the thermal diffusion column which is at mid-height of said column, said desired gas component concentrated in said mid-height section is led out of said thermal diffusion column, and an isotopic equilibrium reaction is allowed to occur thereby increasing the concentration of the desired gas component, which is returned again to the thermal diffusion column.

3. A method of isotope separation according to claim 1 wherein said isotope-containing gas is a mixture of $H_2$ and $D_2$.

4. A method of isotope separation according to claim 1 wherein said hot wall of thermal diffusion column is made of tungsten.

5. A method of isotope separation according to claim 1 wherein said hot wall of thermal diffusion column is made of stainless steel.

6. A thermal diffusion column for concentration of a desired gas component containing a desired isotope and separation of said desired gas component from an isotope-containing gas comprising:

a vertically long reaction vessel which is made of a material resistant to a low temperature and is gas-tight, a hot wall vertically set at the center of said reaction vessel, a means to heat said hot wall to a temperature below a temperature $T_1$ which is the temperature at which the desired isotope begins to undergo an isotopic equilibrium reaction, and a means to cool the outer wall of said reaction vessel to a temperature below the ambient temperature and above a temperature $T_2$ which is the temperature at which said isotope-containing gas begins to condense and liquefy.

7. A thermal diffusion column according to claim 6 wherein said isotope-containing gas is a mixture of $H_2$ and $D_2$.

8. A thermal diffusion column according to claim 6 wherein said hot wall is made of tungsten.

9. A thermal diffusion column according to claim 6 wherein said hot wall is made of stainless steel.

* * * * *